United States Patent
Lee

(10) Patent No.: US 10,263,772 B2
(45) Date of Patent: *Apr. 16, 2019

(54) SMART CARD CHIP FOR GENERATING PRIVATE KEY AND PUBLIC KEY PAIR, AND GENERATION METHOD THEREFOR

(71) Applicant: KEYPAIR CO., LTD., Seoul (KR)

(72) Inventor: Jung-Youp Lee, Namyangju (KR)

(73) Assignee: KEYPAIR CO., LTD., Seoul (KR)

( * ) Notice: Subject to any disclaimer, the term of this patent is extended or adjusted under 35 U.S.C. 154(b) by 168 days.

This patent is subject to a terminal disclaimer.

(21) Appl. No.: 15/107,448

(22) PCT Filed: Dec. 23, 2014

(86) PCT No.: PCT/KR2014/012759
§ 371 (c)(1),
(2) Date: Jun. 22, 2016

(87) PCT Pub. No.: WO2015/099425
PCT Pub. Date: Jul. 2, 2015

(65) Prior Publication Data
US 2016/0315769 A1    Oct. 27, 2016

(30) Foreign Application Priority Data
Dec. 23, 2013 (KR) .................. 10-2013-0161501

(51) Int. Cl.
*H04L 29/06* (2006.01)
*H04L 9/08* (2006.01)
(Continued)

(52) U.S. Cl.
CPC ........ *H04L 9/0877* (2013.01); *H04L 63/0853* (2013.01); *H04W 4/008* (2013.01);
(Continued)

(58) Field of Classification Search
CPC ........ H04L 9/0877; H04L 9/32; H04L 9/328; H04L 63/0823; H04L 63/0853
See application file for complete search history.

(56) References Cited

U.S. PATENT DOCUMENTS

| 2005/0120205 A1* | 6/2005 | Umezawa | H04L 63/0442 713/156 |
| 2012/0036368 A1* | 2/2012 | Spalka | G06F 21/34 713/182 |
| 2015/0134561 A1* | 5/2015 | Ashley | G06Q 99/00 705/342 |

FOREIGN PATENT DOCUMENTS

| KR | 10-2006-0093088 A | 8/2006 |
| KR | 10-0651718 B1 | 12/2006 |

(Continued)

OTHER PUBLICATIONS

International Search Report for International Patent Application No. PCT/KR2014/012759 dated Apr. 1, 2015.

*Primary Examiner* — Dao Q Ho

(57) ABSTRACT

The smart card chip for generating a private key and public key pair in accordance with an embodiment of the present invention comprises: a communication unit for performing at least one of a contact communication with an external device and a near-field wireless communication therewith; a control unit for communicating with the external device through the communication unit and generating a private key and public key pair; and a memory unit for storing the generated private key and public key pair, wherein if receiving a command to generate a private key and public key pair from the external device, the control unit checks if a pre-generated private key and public key pair is stored in the memory unit, and if the pre-generated private key and public key pair is stored in the memory unit, the control unit reads the pre-generated private key and public key pair.

8 Claims, 10 Drawing Sheets

(51) Int. Cl.
*H04W 4/80* (2018.01)
*H04W 12/06* (2009.01)
*H04W 4/00* (2018.01)

(52) U.S. Cl.
CPC ............. *H04W 4/80* (2018.02); *H04W 12/06* (2013.01); *H04L 63/0823* (2013.01)

(56) References Cited

FOREIGN PATENT DOCUMENTS

| KR | 10-2007-0030284 A | 3/2007 |
| KR | 10-2009-0065415 A | 6/2009 |
| KR | 10-2009-0129610 A | 12/2009 |

\* cited by examiner

[Figure 1]
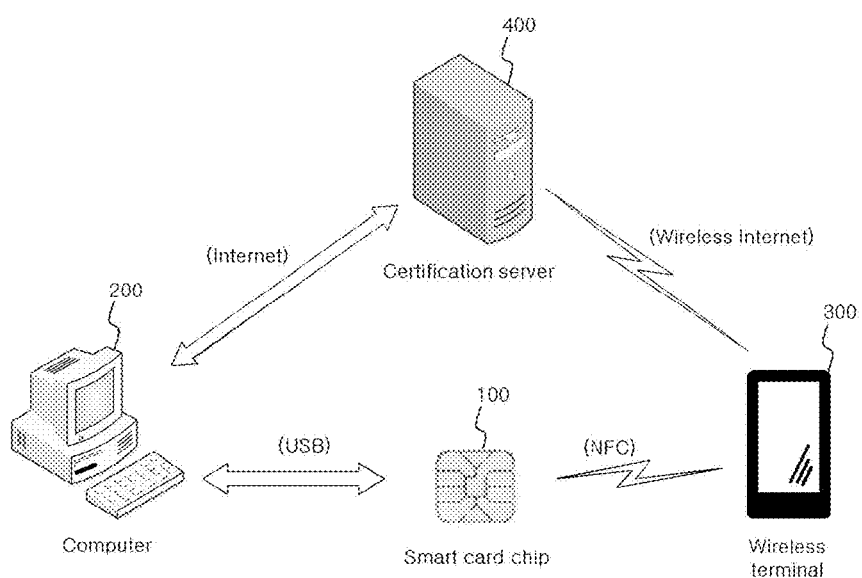

[Figure 2]
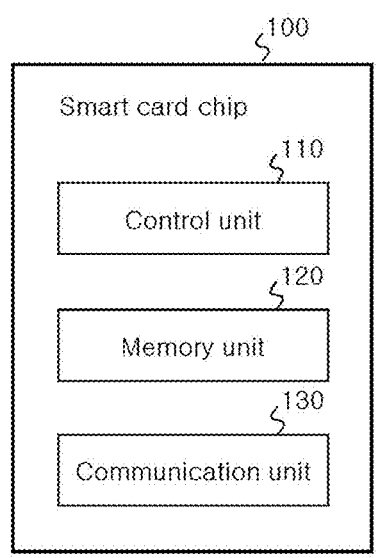

[Figure 3]
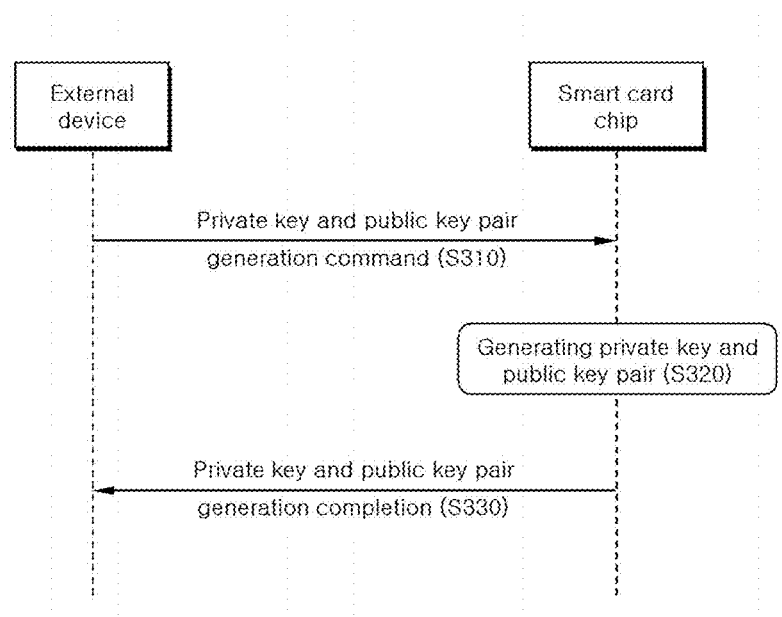

[Figure 4]
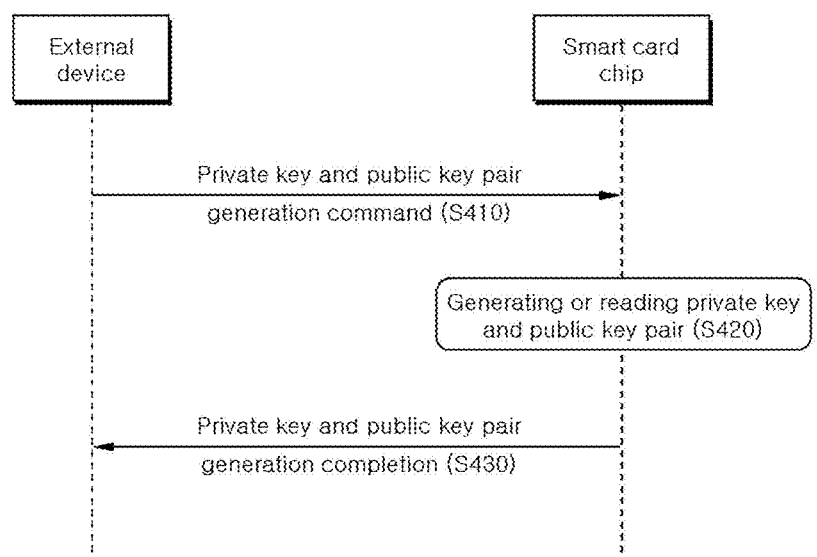

[Figure 5]
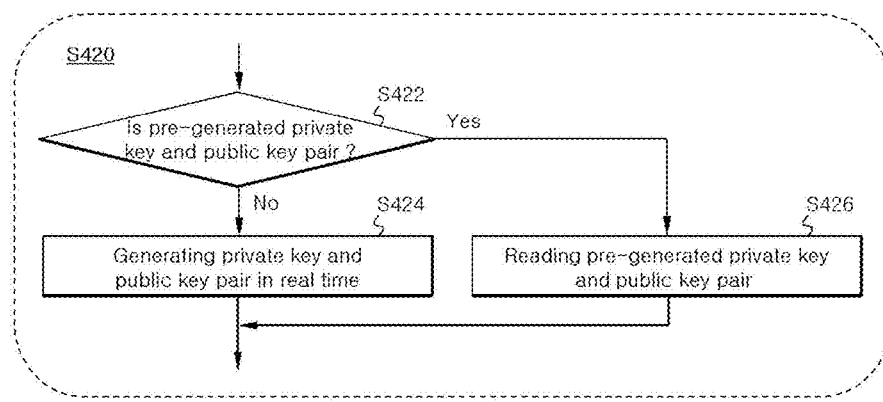

[Figure 6]
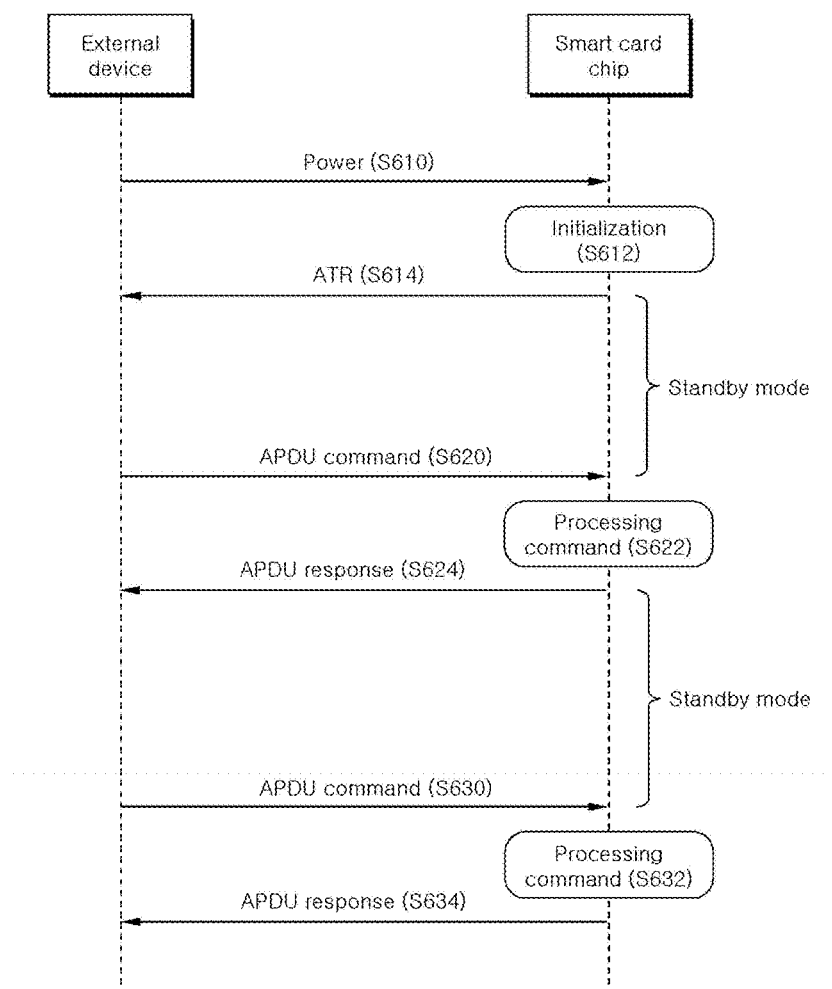

[Figure 7]
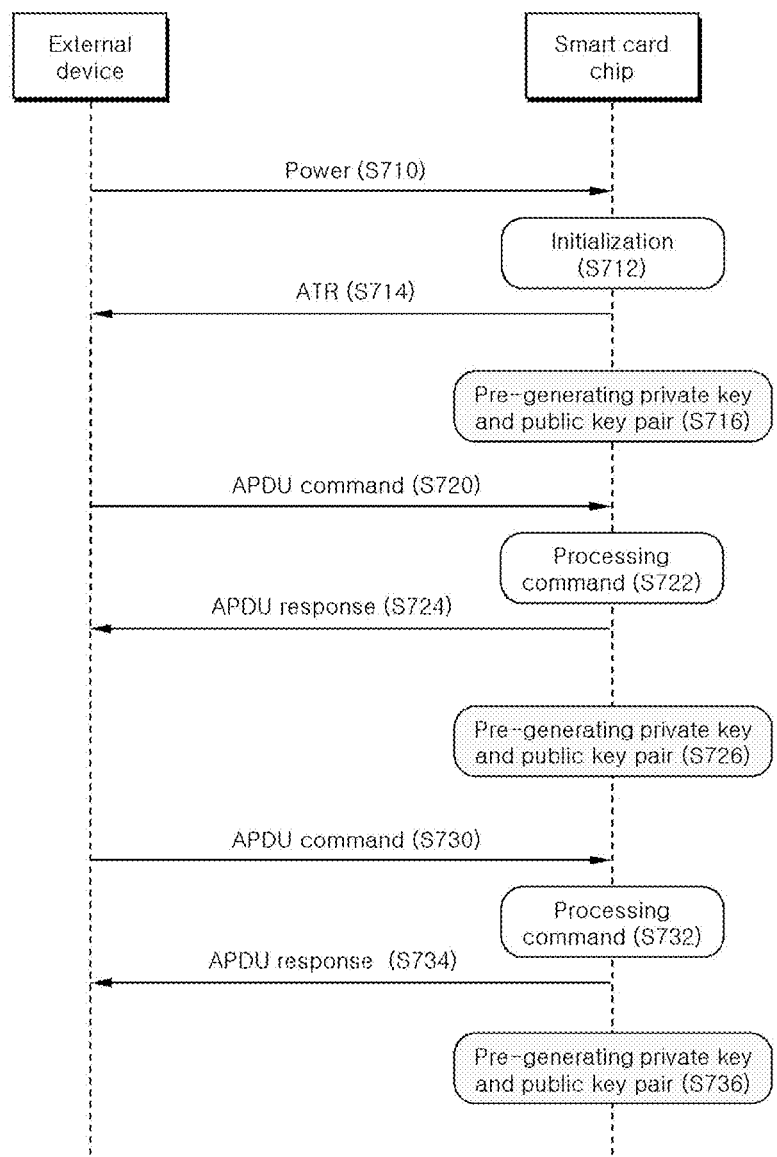

[Figure 8]
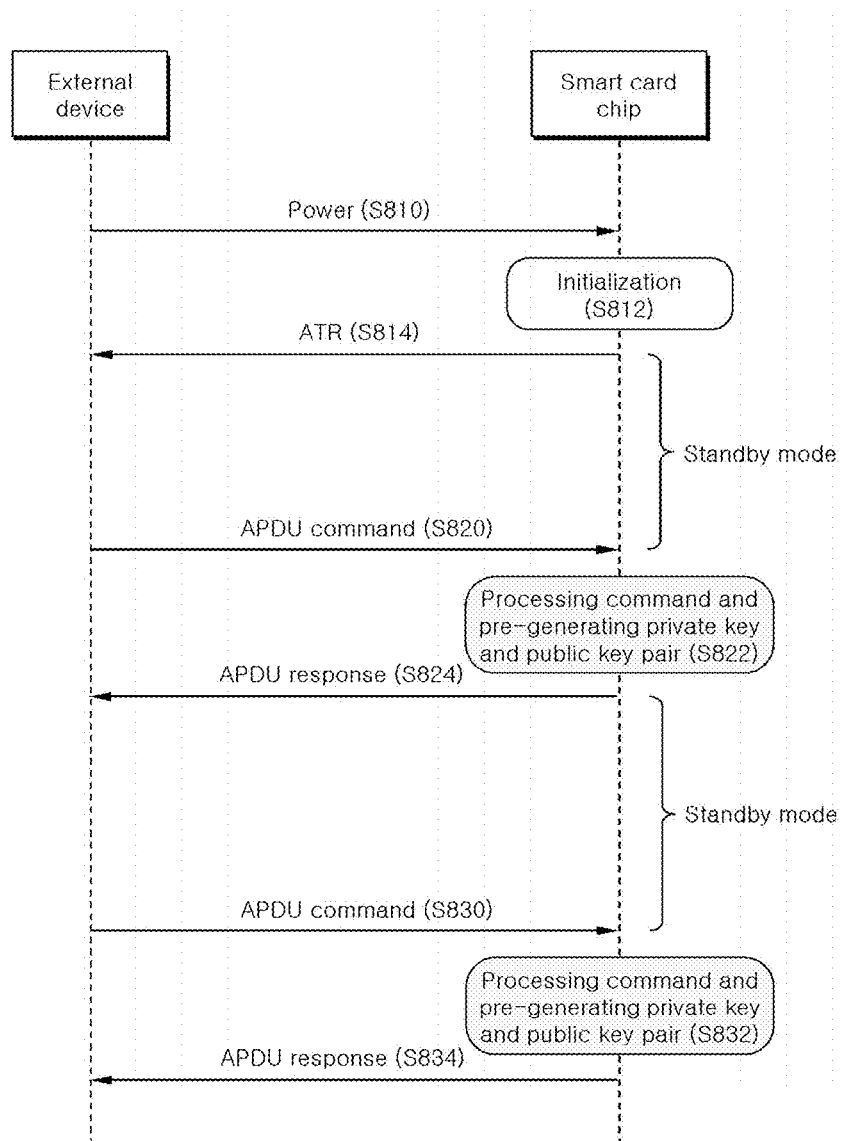

[Figure 9]
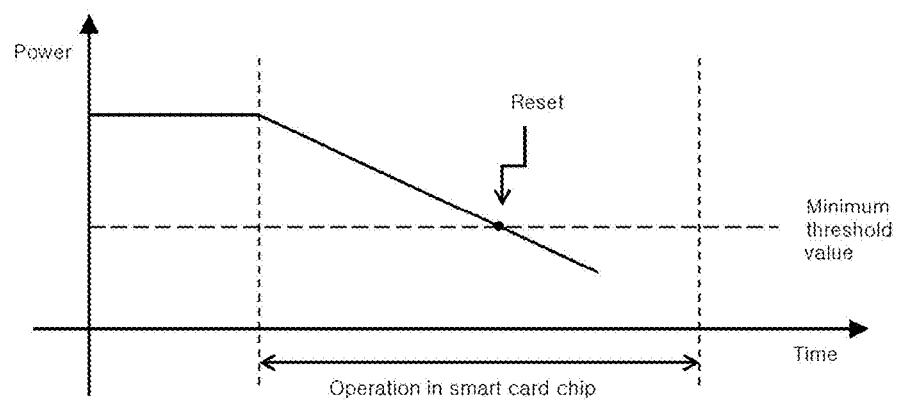

[Figure 10]
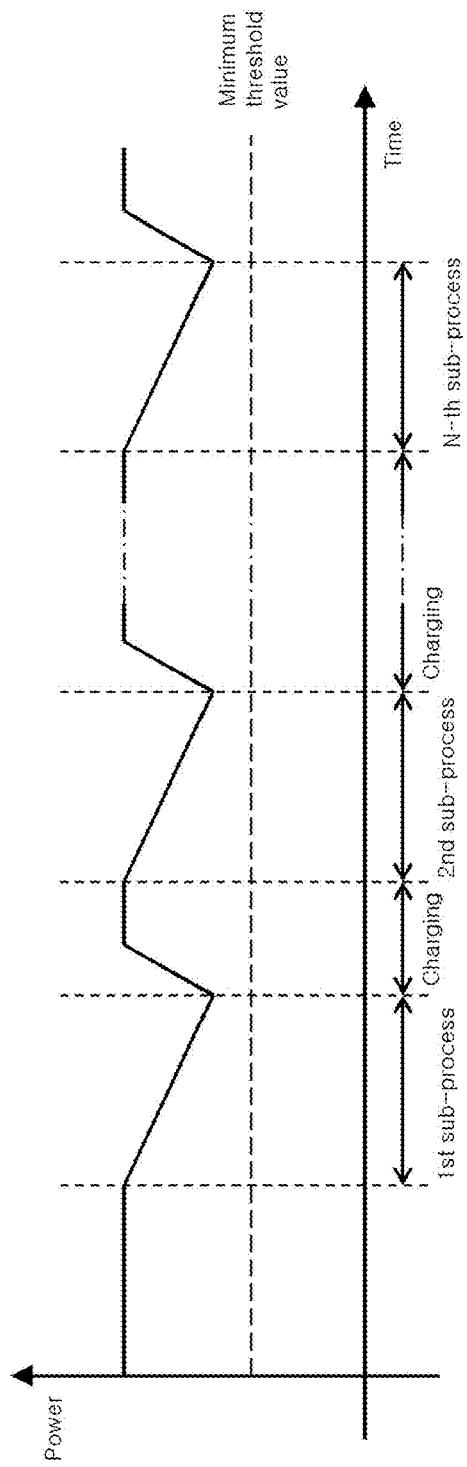

SMART CARD CHIP FOR GENERATING PRIVATE KEY AND PUBLIC KEY PAIR, AND GENERATION METHOD THEREFOR

TECHNICAL FIELD

The present invention relates generally to a smart card chip for generating a private key and public key pair and a generation method thereof, and more particularly to a smart card chip for generating a private key and public key pair in advance by using standby time and a generation method thereof.

BACKGROUND ART

Recently, the KISA (Korea Internet & Security Agency) is working on a certificate cryptosystem upgrading project. The object of this project is to improve a stability of an electronic signature algorithm by raising the length of the private key from 1024-bit to 2048-bit. Besides, since a certificate stored on a hard disk of a personal computer may be exposed to hacking attacks, this project advises to store a certificate on a safe storage medium, e.g. HSM (Hardware Security Module).

The HSM uses a smart card chip as a core component, which is known as an anti-hacking device until now. The smart card chip generates a private key and public key pair which is required in a certificate issue process, and performs an electronic signature which is required in a certificate login process.

At present, in a certification authority system, the RSA (Rivest Shamir Adleman) algorithm is used as an electronic signature algorithm. If the RSA algorithm is improved from 1024-bit to 2048-bit, theoretically, it takes about quadruple time or more to perform operations. Specifically, it usually takes 2~3 seconds and in some cases more than 6 seconds to generate a 1024-bit private key and public key pair in a current smart card chip. If a cryptosystem is improved from 1024-bit to 2048-bit, it usually takes 20~30 seconds and in some cases more than 60 seconds to generate a 2048-bit private key and public key pair in the current smart card chip.

Therefore, in case of being issued a 2048-bit certificate by using the HSM, a user may feel uncomfortable since it may take more than one minute in an issue process. Hence, the KISA wants to reduce a 2048-bit private key and public key pair generation time in the HSM within a few seconds, but a technology solving the above requirement has not yet been suggested.

Meanwhile, the smart card chip can be used as HSM type by using NFC (Near Field Communication). The NFC technology is a communication technology that the smart card chip directly generates a power by using electromagnetic waves emitted from a wireless terminal and communicates with the wireless terminal. The NFC technology has advantages that no battery is required and the security is excellent owing to short connection distances. However, there is a problem that the smart card chip has difficulty in generating enough power to perform the private key and public key pair generation. In addition, it is impossible for the current smart card chip to generate the 1024-bit private key and public key pair through NFC.

In order to resolve such problems, the Korean patent No. 10-0651718 suggested a technology that a portable terminal controls a USIM (Universal Subscriber Identification Module) card to pre-generate the private key and public key pair and the USIM card transmits the pre-generated private key and public key pair in response to a request for generating the private key and public key pair.

However, in smart phone environments providing various services, it is very difficult for the portable terminal to judge the standby time of the smart card chip and control the smart card chip to pre-generate the private key and public key pair. In particular, the smart card chip using NFC does not have enough standby time since the smart card chip can connect with the portable terminal in use. Therefore, it is very difficult for the smart card chip to pre-generate the private key and public key pair in the way according to the above patent. In addition, the initial process using the HSM is a process of being issued a certificate by using the private key and public key pair generated in the smart card chip. Until then, the smart card chip does not usually have enough time to pre-generate the private key and public key pair.

Therefore, there is a demand for new scheme that the smart card chip using NFC can efficiently generate the private key and public key pair.

PRIOR ART

Korean patent No. 10-0651718

DISCLOSURE

Technical Problem

Therefore, the present invention has been made in view of the above-mentioned demands, and it is an object of the present invention to provide a smart card chip for pre-generating a private key and public key pair without depending on control of an external device and a generation method thereof.

It is another object of the present invention to provide a smart card chip for pre-generating a private key and public key pair using NFC and a generation method thereof.

It is further another object of the present invention to provide a smart card chip for generating a private key and public key pair in real time using NFC and a generation method thereof.

It is further another object of the present invention to provide a smart card chip for generating a private key and public key pair in low power NFC environments by dividing a private key and public key pair generation process into two or more private key and public key pair generation subprocesses and a generation method thereof.

Technical Solution

According to one aspect of the present invention, there is provided a smart card chip for generating a private key and public key pair, comprising: a communication unit for performing at least one of a contact type communication and a near field communication with an external device; a control unit for communicating with the external device through the communication unit and generating a private key and public key pair; and a memory unit for storing the generated private key and public key pair, wherein if the control unit receives a command to generate the private key and public key pair from the external device, the control unit checks whether the pre-generated private key and public key pair is stored or not in the memory unit, and if the pre-generated private key and public key pair is stored in the memory unit, the control unit reads the pre-generated private key and public key pair from the memory unit.

According to another aspect of the present invention, there is provided a smart card chip for generating a private key and public key pair, comprising: a communication unit for performing at least one of a contact type communication and a near field communication with an external device; a control unit for communicating with the external device through the communication unit and generating a private key and public key pair; and a memory unit for storing the generated private key and public key pair, wherein if the control unit receives a command from the external device, the control unit pre-generates the private key and public key pair during processing the command.

According to further another aspect of the present invention, there is provided a smart card chip for generating a private key and public key pair, comprising: a communication unit for performing at least one of a contact type communication and a near field communication with an external device; a control unit for communicating with the external device through the communication unit and generating a private key and public key pair; and a memory unit for storing the generated private key and public key pair, wherein if the control unit receives a command from the external device, the control unit pre-generates the private key and public key pair during standby mode after processing the command.

Meanwhile, according to one aspect of the present invention, there is provided a method for generating a private key and public key pair in a smart card chip, comprising: receiving a command from an external device; generating a private key and public key pair while processing the command; and if command processing is completed, responding a command processing completion to the external device.

According to another aspect of the present invention, there is provided a method for generating a private key and public key pair in a smart card chip, comprising: receiving a command from an external device; processing the command; if command processing is completed, responding a command processing completion to the external device; and generating a private key and public key pair during standby mode.

Preferably, the method for generating a private key and public key pair in a smart card chip, further comprising: receiving a command to generate a private key and public key pair from the external device; checking whether a pre-generated private key and public key pair is stored or not in the smart card chip; and if the pre-generated private key and public key pair is stored in the smart card chip, responding a private key and public key pair generation completion to the external device.

Advantageous Effects

The present invention can efficiently minimize a response time corresponding to a request for generating a private key and public key pair since a smart card chip pre-generates and stores the private key and public key pair during standby time.

The present invention can efficiently generate a private key and public key pair in low power NFC environments by dividing a private key and public key pair generation process into two or more private key and public key pair generation sub-processes.

Also, the present invention can rapidly issue a 2048-bit certificate within a few seconds by using a HSM comprising a smart card chip, and can improve the stability of the electronic signature algorithm.

DESCRIPTION OF THE DRAWINGS

The above and other aspects, features and advantages of the present invention will become more apparent from the following detailed description when taken in conjunction with the accompanying drawings in which:

FIG. 1 is a diagram illustrating that a smart card chip according to an embodiment of the present invention is used in a certification authority system of personal computer environments and/or smart phone environments;

FIG. 2 is a diagram illustrating a structure of a smart card chip according to an embodiment of the present invention;

FIG. 3 is a flowchart illustrating a process for generating and using a private key and public key pair in a smart card chip according to the prior art;

FIG. 4 is a flowchart illustrating a process for generating and using a private key and public key pair in a smart card chip according to an embodiment of the present invention;

FIG. 5 is a flowchart illustrating a detailed process for step S420 in FIG. 4;

FIG. 6 is a flowchart illustrating a general process for using a smart card chip;

FIG. 7 is a flowchart illustrating a process for generating a private key and public key pair during standby mode in a smart card chip according to an embodiment of the present invention;

FIG. 8 is a flowchart illustrating a process for generating a private key and public key pair while processing a command in a smart card chip according to an embodiment of the present invention;

FIG. 9 is a graph illustrating power change to operation time when a smart card chip according to the prior art is connected with a contactless type external device; and FIG. 10 is a graph illustrating power change to operation time during a private key and public key pair generation sub-processes, when a smart card chip according to an embodiment of the present invention is connected with a contactless type external device.

MODE FOR INVENTION

Preferred embodiments of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for clarity and conciseness.

FIG. 1 is a diagram illustrating that a smart card chip according to an embodiment of the present invention is used in a certification authority system of personal computer environments and/or smart phone environments.

Referring to FIG. 1, the certification authority system includes a smart card chip 100, a computer 200, a wireless terminal 300, a certification server 400, etc.

The smart card chip 100 is implemented as a HSM (Hardware Security Module) in forms of USB (Universal Serial Bus), plastic card, etc. In case the smart card chip 100 performs a contact type communication, the smart card chip 100 performs a private key and public key pair generation and an electronic signature using USB communication with the computer 200 which can access to the certification server 400. In case the smart card chip 100 performs a contactless type communication, the smart card chip 100 performs the private key and public key pair generation, and the electronic signature using near field communication with the wireless terminal 300 which can access to the certification server 400.

Herein, the computer 200 can be any type of computer, e.g. personal computer or notebook, which can perform USB communication via a USB port and communicate with the certification server 400 through a wired or wireless internet. The wireless terminal 300 can be any type of wireless terminal, e.g. smart phone or tablet PC, which can perform NFC and communicate with the certification server 400 through a wireless internet.

FIG. 2 is a diagram illustrating a structure of the smart card chip 100 according to an embodiment of the present invention.

Referring to FIG. 2, the smart card chip 100 according to an embodiment of the present invention includes a control unit 110, a memory unit 120, a communication unit 130, etc.

The control unit 110 can be implemented, for example, as a central processing unit or crypto accelerator, controls the memory unit 120 and the communication unit 130, and performs a private key and public key pair generation, an electronic signature, etc.

The memory unit 120 can be implemented, for example, as an EEPROM (Electrically Erasable Programmable Read Only Memory) and stores an operating system for the smart card chip, a private key and public key pair, a certificate, etc.

The communication unit 130 includes an internal antenna and performs near field communication with an external device using an induced power from the external device. Optionally, the communication unit 130 can be implemented to perform contact type communication through a smart card reader or USB.

Hereinafter, with reference to FIGS. 3 to 10, a private key and public key pair generation process in the smart card chip according to an embodiment of the present invention will now be described.

Firstly, FIG. 3 is a flowchart illustrating a process for generating and using a private key and public key pair in a smart card chip according to the prior art.

Referring to FIG. 3, in step S310, an external device transmits a private key and public key pair generation command to a smart card chip. In step S320, the smart card chip generates a private key and public key pair. In step S330, the smart card chip responds a private key and public key pair generation completion to the external device.

In this way, the smart card chip according to the prior art generates the private key and public key pair only if the external device requests for generating the private key and public key pair. In this case, as described in Background Art, it takes a long time to generate the private key and public key pair, and in particular, it usually takes 20~30 seconds and in some cases more than 60 seconds to generate a 2048-bit private key and public key pair.

Meanwhile, FIG. 4 is a flowchart illustrating a process for generating and using a private key and public key pair in a smart card chip according to an embodiment of the present invention. And FIG. 5 is a flowchart illustrating a detailed process for step S420 in FIG. 4.

Referring to FIG. 4, in step S410, an external device transmits a private key and public key pair generation command to a smart card chip. In step S420, the smart card chip generates a private key and public key pair or reads a pre-generated private key and public key pair.

Specifically, referring to FIG. 5, if the smart card chip receives the private key and public key pair generation command from the external device, in step S422, the control unit 110 of the smart card chip retrieves the pre-generated private key and public key pair from the memory unit 120. If the pre-generated private key and public key pair is not stored in the memory unit 120, in step S424, the control unit 110 of the smart card chip generates the private key and public key pair in real time. In contrary, if the pre-generated private key and public key pair is stored in the memory unit 120, in step S426, the control unit 110 of the smart card chip reads the pre-generated private key and public key pair from the memory unit 120 without generating the private key and public key pair.

Then, in step S430, the control unit 110 of the smart card chip responds a private key and public key pair generation completion to the external device through the communication unit 130.

In relation to this, hereinafter, with reference to FIGS. 6 to 10, a private key and public key pair pre-generation process in the smart card chip according to an embodiment of the present invention will now be described.

Firstly, FIG. 6 is a flowchart illustrating a general process for using a smart card chip.

Referring to FIG. 6, in step S610, an external device supplies a power to a smart card chip. In step S612, the smart card chip performs initialization. After completing initialization, in step S614, the smart card chip transmits an ATR (Answer To Reset) signal to the external device. Then, the smart card chip changes into standby mode and waits for receiving an APDU (Application Protocol Data Unit) command from the external device.

In step S620, if the external device transmits the APDU command to the smart card chip, in step S622, the smart card chip escapes from standby mode and processes the command. And, in step S624, the smart card chip transmits an APDU response to the external device. Then, the smart card chip changes into standby mode again and waits for receiving another APDU command from the external device.

Similarly, in step S630, if the external device transmits the APDU command to the smart card chip again, in step S632, the smart card chip escapes from standby mode and processes the command. And, in step S634, the smart card chip transmits the APDU response to the external device. Then, the smart card chip changes into standby mode again and waits for receiving further another APDU command from the external device. Then, these steps are repeatedly performed.

Meanwhile, a smart card chip according to an embodiment of the present invention pre-generates and stores a private key and public key pair while waiting for receiving a command from an external device. Hereinafter, with reference to FIG. 7, a private key and public key pair pre-generation process will now be described.

FIG. 7 is a flowchart illustrating a process for generating a private key and public key pair during standby mode in a smart card chip according to an embodiment of the present invention.

Referring to FIG. 7, in step S710, an external device supplies a power to a smart card chip. In step S712, the smart card chip performs initialization. After completing initialization, in step S714, the smart card chip transmits an ATR (Answer To Reset) signal to the external device. Then, in step S716, the smart card chip pre-generates and stores the private key and public key pair while waiting for receiving another command from the external device.

In step S720, if the external device transmits an APDU command to the smart card chip, in step S722, the smart card chip processes the command. And, in step S724, the smart card chip transmits an APDU response to the external device. Then, in step S726, the smart card chip pre-generates and stores the private key and public key pair while waiting for receiving further another command from the external device.

Similarly, in step S730, if the external device transmits the APDU command to the smart card chip again, in step S732, the smart card chip processes the command. And, in step S734, the smart card chip transmits the APDU response to the external device. Then, in step S736, the smart card chip pre-generates and stores the private key and public key pair while waiting for receiving further another command from the external device. Then, these steps are repeatedly performed.

For reference, since the external device decides occurrence of error in the smart card chip if the smart card chip does not respond to the APDU command from the external device within a predetermined time period, the smart card chip should be able to process the APDU command transmitted from the external device while pre-generating the private key and public key pair.

Therefore, if the smart card chip receives the APDU command from the external device during pre-generating the private key and public key pair (see the steps S716, S726, and S736 in FIG. 7), the control unit 110 of the smart card chip temporarily stores current results of the private key and public key pair generation process in the memory unit 120, processes the received APDU command by priority, and transmits the APDU response to the external device. Then, the control unit 110 of the smart card chip continues the private key and public key pair generation process. If the smart card chip cannot temporarily store current results of the private key and public key pair generation process in memory unit 120, the control unit 110 of the smart card chip cancels the current private key and public key pair generation process, processes the received APDU command by priority, transmits the APDU response to the external device, and restarts the private key and public key pair generation process.

Meanwhile, the step of pre-generating the private key and public key pair in standby mode, in FIG. 7, has a restriction that power should be consistently supplied to the smart card chip. That is, this step can be implemented in case the smart card chip is continuously supplied with power through contact type communication, e.g. USB communication, or in case the smart card chip is continuously supplied with power induced from outside electromagnetic waves through contactless type communication, e.g. NFC.

When the smart card chip is connected to a contact type external device, e.g. smart card reader, the power supplied from the external device is sufficient and the standby mode time for pre-generating the private key and public key pair is sufficient. However, when the smart card chip is connected to a contactless type external device, e.g. wireless terminal, the power supplied from the external device may not be sufficient. This is because the wireless terminal generates electromagnetic waves only when it performs near field communication. Thus, it is impossible for an existing smart card chip to generate a 1024-bit private key and public key pair during standby mode.

In order to overcome this restriction, the present invention suggests that the smart card chip generates the private key and public key pair while processing a command, in case of the contactless type external device.

In relation to this, FIG. 8 is a flowchart illustrating a process for generating a private key and public key pair while processing a command in a smart card chip according to an embodiment of the present invention.

Referring to FIG. 8, in step S810, an external device supplies a power to a smart card chip. In step S812, the smart card chip performs initialization. After completing initialization, in step S814, the smart card chip transmits an ATR (Answer To Reset) signal to the external device. Then, the smart card chip changes into standby mode and waits for receiving an APDU (Application Protocol Data Unit) command from the external device.

In step S820, if the external device transmits the APDU command to the smart card chip, in step S822, the smart card chip processes the command. In this case, the smart card chip generates the private key and public key pair while processing the command. And, in step S824, the smart card chip transmits an APDU response to the external device. Then, the smart card chip changes into standby mode again and waits for receiving another APDU command from the external device.

Similarly, in step S830, if the external device transmits the APDU command to the smart card chip again, in step S832, the smart card chip processes the command and generates the private key and public key pair. And, in step S834, the smart card chip transmits the APDU response to the external device. Then, the smart card chip changes into standby mode again and waits for receiving further another APDU command from the external device. Then, these steps are repeatedly performed.

Meanwhile, the step of processing the command and generating the private key and public key pair together, in FIG. 8, has a restriction that a power enough to generate the private key and public key pair during processing one command should be consistently supplied to the smart card chip.

As illustrated in FIG. 9, when the smart card chip is connected to a contactless type external device, since the power consumed in operation of the smart card chip is larger than the power generated by electromagnetic waves from the external device, the power is gradually decreased during processing the command. Finally, the power may drop below the minimum threshold value which can drive the smart card chip, and then the smart card chip may be reset.

Therefore, there is a demand for alternative measures that the smart card chip can efficiently generate the private key and public key pair even if the smart card chip cannot complete the private key and public key pair generation during processing one command.

According to a preferred embodiment of the present invention, the smart card chip divides the private key and public key pair generation process into two or more private key and public key pair generation sub-processes. And, the smart card chip performs one or more sub-processes whenever the smart card chip processes the command. Then, by performing these sub-processes continually, the smart card chip completes all of the sub-processes and pre-generates the private key and public key pair. That is, the smart card chip according to the present invention performs one or more private key and public key pair generation sub-processes during processing one command (see the step S822). Then, if all of the sub-processes are not completed, the smart card chip saves current states of the private key and public key pair generation process in the memory unit 120 and temporarily stops the private key and public key pair generation process. Thereafter, the smart card chip performs remaining sub-processes during processing the next command (see the step S832) and in this way completes the entire private key and public key pair generation process.

In relation to this, hereinafter, the private key and public key pair generation sub-processes in the smart card chip according to an embodiment of the present invention will now be described.

The private key and public key pair used in the certification authority system is, for example, the private key "D" and the public key "(N, E)" in the RSA (Rivest Shamir Adleman) algorithm. The Algorithm for generating the private key "D" and the public key "(N, E)" is as follows.

[Algorithm for Generating the Private Key "D" and the Public Key "(N, E)" of the RSA]

1) Generate different large prime numbers "P" and "Q" which have the same number of digits.
2) Calculate "N=P×Q" and "phi=(P−1)×(Q−1)".
3) Select "E" which satisfies "1<E<phi" and "GCD(E, phi)=1" (where GCD is the greatest common divisor).
4) Calculate "D" which satisfies "1<D<phi" and "E×D≡1 (mod phi)" by using the extended Euclidian algorithm.
5) Output the private key "D" and the public key "(N, E)".

In the RSA algorithm, the operation occupying most of operation time is the operation for generating different large prime numbers "P" and "Q" in the step 1). Although there are various ways of generating a large prime number, in an embodiment of the present invention, the smart card chip generates an arbitrary large number and judges whether it is a prime number or a composite number through the Miller-Rabin test.

[Algorithm for Generating a Large Prime Number]

1) Generate an arbitrary large number "Z".
2) Judge whether it is a prime number or a composite number through the Miller-Rabin test.
3) If "Z" is a composite number, return to the step 1).
4) If "Z" is a prime number, output "Z".

[Miller-Rabin Test for an Arbitrary Large Number "Z"]

1) Calculate "S" and "R" which satisfy "Z×1=2S×R" (where "R" is an odd number).
2) Execute the below steps from "i=1" to "i=t" (where "t" is a security parameter and is usually "5" if "Z" is a 1024-bit number).
2.1) Select an arbitrary number "A" which satisfies "1<A<Z−1".
2.2) Calculate "$Y=A^R \bmod Z$".
2.3) If "Y" is neither "1" nor "Z−1", execute the below steps.
2.3.1) Perform "j=1".
2.3.2) If "j" is smaller than "S" and "Y" is not equal to "Z−1", execute the below steps repeatedly.
2.3.2.1) Calculate "$Y=Y^2 \bmod Z$".
2.3.2.2) If "Y" is equal to "1", output "Composite number" and exit the algorithm.
2.3.2.3) Perform "j=j+1".
2.3.3) If "Y" is not equal to "Z−1", output "Composite number" and exit the algorithm.
3) Output "Prime number" and exit the algorithm.

In the Miller-Rabin test, the operation occupying most of operation time is the modular exponentiation operation, e.g. calculation "$Y=A^R \bmod Z$" in the step 2.2) and calculation "$Y=Y^2 \bmod Z$" in the step 2.3.2.1).

Eventually, in case of generating the private key and public key pair used in the certification authority system, the operation occupying most of operation time is the modular exponentiation operation.

Therefore, in a preferred embodiment of the present invention, the smart card chip divides into two or more private key and public key pair generation sub-processes based on the modular exponentiation operation and thereby disperses the operation time evenly. For example, the first sub-process of the private key and public key pair generation algorithm is performed until completion of the first modular exponentiation operation, the second sub-process is performed until completion of the second modular exponentiation operation, the n−1$^{th}$ sub-process is performed until completion of the last modular exponentiation operation, and the n$^{th}$ sub-process is performed until completion of the remaining operations of the private key and public key pair algorithm. Thereby, each operation time of the sub-processes is dispersed evenly.

Also, in another preferred embodiment of the present invention, the first sub-process of the private key and public key pair generation algorithm is performed until completion of the first prime number (P) generating operation, the second sub-process is performed until completion of the second prime number (Q) generating operation, and the third sub-process is performed until completion of the remaining operations of the private key and public key pair algorithm.

Meanwhile, FIG. 10 is a graph illustrating power change to operation time during the private key and public key pair generation sub-processes, when a smart card chip according to an embodiment of the present invention is connected with a contactless type external device.

Referring to FIG. 10, a smart card chip according to an embodiment of the present invention performs the first sub-process of the private key and public key pair generation algorithm and then is charged to get the required power for the next operation. Similarly, the smart card chip performs the second sub-process of the private key and public key pair generation algorithm and then is charged to get the required power for the next operation. In this way, the smart card chip completes the private key and public key pair generation process.

While the invention has been shown and described with reference to a certain preferred embodiment thereof, it will be understood by those skilled in the art that various changes in form and details may be made therein without departing from the spirit and scope of the invention as defined by the appended claims.

The invention claimed is:

1. A smart card chip for generating a private key and public key pair, comprising:
   a communication unit for performing at least one of a contact type communication and a near field communication with an external device;
   a control unit for communicating with the external device through the communication unit and generating a private key and public key pair; and
   a memory unit for storing the generated private key and public key pair,
   wherein in response to the control unit receiving a command from the external device, the control unit pre-generates the private key and public key pair during processing the command,
   wherein the control unit generates the private key and public key pair by dividing a private key and public key pair generation process to generate a plurality of sub-processes, and
   wherein the dividing is based on one or more of a modular exponentiation operation and a prime number generating operation, and
   wherein the control unit allocates charging time between the performance of each the sub-processes.

2. A smart card chip for generating a private key and public key pair, comprising:

a communication unit for performing at least one of a contact type communication and a near field communication with an external device;

a control unit for communicating with the external device through the communication unit and generating a private key and public key pair; and a memory unit for storing the generated private key and public key pair, wherein in response to the control unit receiving a command from the external device, the control unit pre-generates the private key and public key pair while waiting to receive a further command after processing the command, wherein the control unit generates the private key and public key pair by dividing a private key and public key pair generation process to generate a plurality of sub-processes, wherein the dividing is based on one or more of a modular exponentiation operation and a prime number generating operation, and wherein the control unit allocates charging time between the performance of each of the sub-processes.

3. A method for generating a private key and public key pair in a smart card chip, comprising:

receiving a command from an external device;

generating a private key and public key pair using a private key and public key pair generation process while processing the command; and in response to the command processing being completed, responding a command processing completion to the external device, wherein the private key and public key pair generation process is divided to generate a plurality of sub-processes, the dividing being based on one or more of a modular exponentiation operation and a prime number generating operation;

allocating charging time between the performance of each of the sub-processes; and charging the smart card chip during the allocated charging time between the performance of each of the sub-processes.

4. The method of claim 3, further comprising:

receiving a command to generate a private key and public key pair from the external device;

checking whether a pre-generated private key and public key pair is stored or not in the smart card chip; and when the pre-generated private key and public key pair is stored in the smart card chip, responding a private key and public key pair generation completion to the external device.

5. The method of claim 4, further comprising:

when the pre-generated private key and public key pair is not stored in the smart card chip, generating the private key and public key pair in real time using the private key and public key pair generation process.

6. A method for generating a private key and public key pair in a smart card chip, comprising:

receiving a command from an external device;

processing the command;

in response to the command processing being completed, responding a command processing completion to the external device; and generating a private key and public key pair using a private key and public key pair generation process while waiting to receive a further command, wherein the private key and public key pair generation process is divided to generate a plurality of sub-processes, the dividing being based on one or more of a modular exponentiation operation and a prime number generating operation;

allocating charging time between the performance of each of the sub-processes; and charging the smart card chip during the allocated charging time between the performance of each of the sub-processes.

7. The method of claim 6, further comprising:

receiving a command to generate a private key and public key pair from the external device;

checking whether a pre-generated private key and public key pair is stored or not in the smart card chip; and when the pre-generated private key and public key pair is stored in the smart card chip, responding a private key and public key pair generation completion to the external device.

8. The method of claim 7, further comprising:

when the pre-generated private key and public key pair is not stored in the smart card chip, generating the private key and public key pair in real time using the private key and public key pair generation process.

* * * * *